Figure 1:
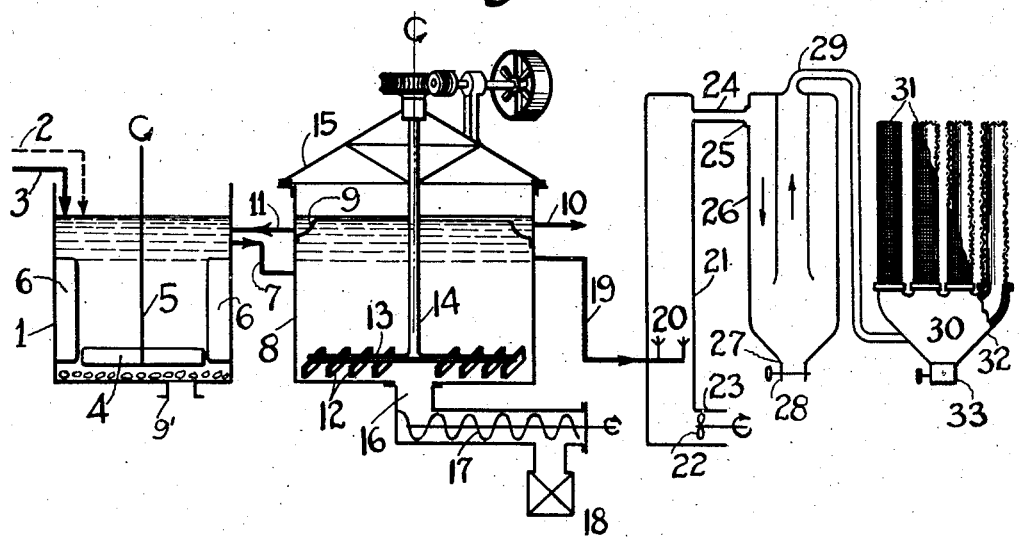

May 9, 1933.  J. F. WAIT  1,907,690

PROCESS FOR PREPARING CLAYS

Filed Dec. 9, 1929

INVENTOR
Justin F. Wait
BY
Gifford, Scull & Burgess
ATTORNEYS

Patented May 9, 1933

1,907,690

UNITED STATES PATENT OFFICE

JUSTIN F. WAIT, OF NEW YORK, N. Y.

PROCESS FOR PREPARING CLAYS

Application filed December 9, 1929. Serial No. 412,683.

This process relates to improvements in mining, refining and using clay and clay-like products such as fine China clay and various forms of bentonite and like products. The expression "clay" as used herein means substances of this general sort wherein the particles are unusually small and of a size to produce a colloidal solution when the particles are separated under favorable conditions and agglomeration is retarded or prevented. Colloidal properties are made use of in treating such clays by this process. I recognize that there may be several or many kinds of clays, especially those with a large particle size which will not respond to the process with any great degree of satisfaction.

Natural deposits of such clay generally occur as a multiplicity of layers wherein some few are of a quality acceptable to the trade. These layers usually vary from a fraction of an inch to a small number of feet in thickness. One layer may be of a delicate composition, relatively free from impurities and quite satisfactory. Another layer, adjacent thereto or nearly so may have a large portion of impurities and a small fraction of acceptable material may be contained therein.

The cost of mining and separating good clay is then very excessive. For example, a layer of about twelve inches thick costs considerable to withdraw from the deposit as in so doing greater portions of poor trade material must be mined and moved. This is particularly true where the veins or layers are tilted as is frequently the case.

I have found that it is both possible to treat adjacent and nearby deposits in an improved manner whereby good portions of inferior clay may be recovered with the good layers and without cost of mining two or more layers separately or assorting the parts after mining. I have also found that it is possible to greatly reduce handling costs and to produce a uniformity of product as desired by the trade.

With clays of this kind I have been able to throw out undesirable portions by controlling the specific gravity of the clay and liquid mixture. For example, if a clay containing silicious or mineralized impurity is diluted with water so that the water is more than 65% of the mixture to a give a specific gravity of between about 1.200 and 1.090, the equivalent properties including viscosity and apparent specific gravity, are such as to permit of rapid separation as by settling or centrifugal force. This action causes a concentration of the silicious and/or mineralized particles and produces another layer of wet fluid clay which is then relatively free from these materials.

The wet clay may then be separated from the layer of concentrated impurities as by decantation. I have found that this "decant", or its equivalent, if controlled to have a specific gravity of from about 1.030 to 1.080 will yield a refined product suitable for use. The impure fraction will generally run from specific gravity readings of below about 1.090 for the upper layers of impurities to in excess of about 1.200 for the lower layers of impurities. The control will be made so as to give the desired quality from the clay of adjacent or close by layers, which have been selected and so treated and each of which adds a corresponding active feature to the final blended product. The measurements for this operation may be made by use of an ordinary hydrometer. The readings may be taken under normal operating conditions. The limits given are for ordinary clays. The claims are limited to the general type of clay which act in the manner described.

In preparing a dry product such as may be required for shipment or use, I find it desirable to concentrate and to increase the specific gravity of the mass to between about 1.100 and 1.195. This yields a mass which can be conveniently handled and yet which is relatively low in moisture. This concentration may be accomplished as by settling. The water thus segregated may be used for succeeding quantities of clay thus effecting water economy.

The method of separation employed to carry out my process may be a common method such as settling or centrifugal, electric or magnetic separation.

Some impurities, particularly those of an organic nature, will not collect with the silicious or mineralized fraction. On the other hand they will generally accumulate in a layer of high liquid content and low clay content. To facilitate the removal of such impurity, I employ a method of separation wherein a control layer is isolated. A concentration such as to give a specific gravity of between about 1.100 and 1.195 will enable the process to be operated so as to remove organic and like impurities and at the same time permit the recovery of water to be used with subsequent quantities of clay.

The method of drying of clays frequently determines its characteristics. I have found that contact with air of low moisture content yields a desired form and can be accomplished at low cost by causing relative motion between the moist clay and the air.

The extent of the drying depends upon the particular use of the final product. I have found that a product dried to below 15% of liquid content is usually acceptable. The process makes it possible to dry to below 5% which further increases its commercial value.

In utilizing some clays, as for bleaching, a chemical treatment of the clay, as with an acid, often increases its effectiveness. Under such conditions the chemical treatment can best be effected soon after separation of the purified fraction. One phase of my invention therefore includes chemical treatment of such fraction prior to drying. Excess of acid may be neutralized as by utilizing the alkaline contents which are normally a part of such clays. To effect this I have developed a variation of my process whereby "wash" water removed from a purified fraction is contacted with clay which has been acid treated.

I have found that occasionally the heavier matter forming an impurity in the clay is composed of a high mineral content as compared with the clay. This mineral is frequently valuable and may be isolated and/or treated so as to yield a pure metal or alloy. By thus improving the value of a clay, and making it possible to utilize low grade deposits it is possible to commercially produce a mineral which would otherwise not be feasible because of the mining, handling and concentrating costs.

When applying clays for the purification of oil or other substance, particles of one kind or size will frequently interfere with the operation and therefore be detrimental to economic procedure. I have found that by treating such clays in the manner described herein or its equivalent, such detrimental fractions may be removed. For example, if clay is diluted in water, or aqueous solution detrimental fractions may be separated as by settling so that when the clay is subsequently mixed with material to be treated which may be different in viscosity or density or both, the procedure will be more economically carried out.

In applying the process, it is sometimes desirable to employ continuous features wherein there is no definite period of rest as I have found that slight motion of the clay-liquid mixture facilitates separation and handling and prevents formation of a "stiff" clay in the layers of concentration.

Figure 2:
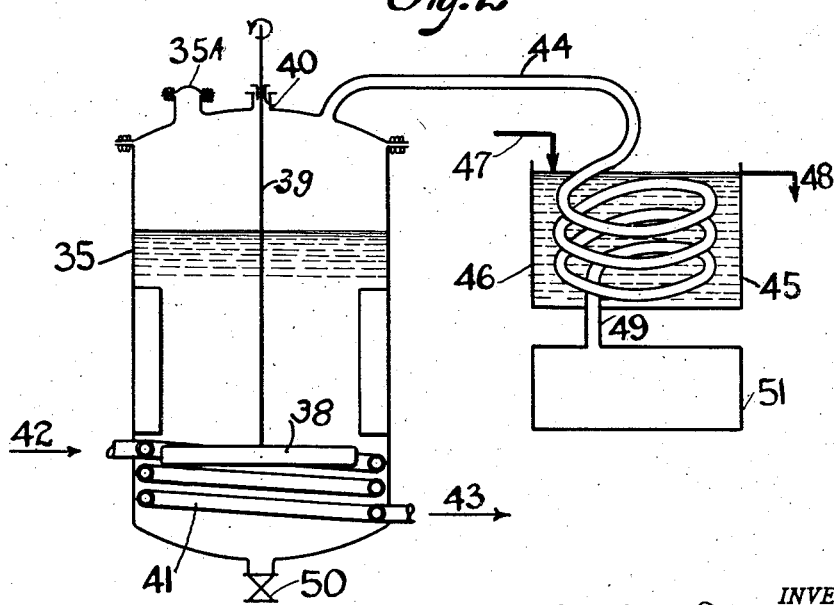

A manner of operating the process is illustrated in Fig. 1 which shows an arrangement of apparatus with parts in vertical section. Fig. 2 is a vertical section of apparatus in which the material may be further treated. The mined clay is introduced into vessel 1 by a conveyor or other means indicated by dotted line 2, together with the appropriate amount of liquid through pipe line 3. Mixture is effected by the agitator blade 4 turned by the shaft 5 and in combination with baffles 6. The mixture of clay and liquid is then passed through the outlet 7 into the separator 8 preferably entering at about the level indicated.

Lumps of matter which still exists or which cannot be mixed with the liquid drops to the bottom of vessel 1 and may be removed as required as through the outlet 9'. The fluid level in 1 may be kept at about the same as in vessel 8 by means of the circular overflow lip 9 with drainage outlet 10 running to waste with organic impurities or through outlet 11 which may be at a lower level than 10 to permit flow of organic impurities back into vessel 1 when this recovered liquid is reused for succeeding portions of clay.

Another separated fraction in vessel 8 is the "residual" containing silicious or mineralized matter. This may be collected by scraper blades 12 carried by arm 13 and rotated by means of shaft 14. The supporting yoke and means for driving and controlling the shaft 14 are illustrated as 15.

The heavier clay with its concentrated impurities may be discharged through the outlet 16 and moved as by conveyor 17 to a valved outlet 18 located as desired.

The central fraction containing the purified clay may be discharged through an outlet 19 and passed through spray nozzles 20 in tower 21. Air of low moisture content may be forced by fan 22 through air inlet 23 at such a velocity as to carry the sprayed mass to the top of the tower 21 and through its outlet 24. Upon entering the inlet 25 of the dryer and separator 26, the air further drys the clay. Relative motion and good contact is insured by imposing a difference in velocity of the air and the wet clay. The wet clay is in a finely divided form to insure a large specific surface and hence rapid and thorough drying.

Portions of the dried clay are discharged into the cone hopper 27 and are withdrawn through the outlet 28. Other portions follow the direction of the arrow and pass through an outlet 29 and into a dust separator 30. Fabric filters 31 allow air to pass but retain most of the valuable clay which drops therefrom into hopper 33 and is discharged therefrom through the outlet 33.

Chemical treatment may be brought about as by adding a suitable mixing vessel to the line 19 so that purified clay-liquid material passing therethrough is acidified or otherwise treated. This vessel might be similar to vessel 1.

Other types of apparatus may be used with equivalent results. The liquid used will depend upon the results desired and the cost of operation therewith. Additional vessels and steps may be added to give repetition of the action of those described, thus effecting a greater degree of separation and hence better purification.

Material discharged from outlet 28 and/or 33 may be introduced into the closed vessel 35 through the bolted cover 35A with such treating agent as may be selected. The mixture is preferably agitated as by means of paddle 38 driven by shaft 39 turning in a stuffing box 40. The heating coil 41 with inlet line 42 and condensate line 43 may be used to control the temperature. Volatilized material may be discharged through a vapor line 44 and condensed in the coil 45 by means of a cooling liquid contained in vessel 46 and entering at 47 and leaving at 48. Recovered liquid is passed out through the pipe 49.

The treated clay may be discharged as through the valved outlet 50. Pressure or vacuum may be imposed upon the vessel 35 in which case a receiver 51 may be used to collect condensate.

I claim:

1. The process of refining clay which comprises adding a liquid, producing a fluid mixture with an excess of 65% of liquid, permitting the mixture to form a plurality of layers of different densities, separating a fraction of an apparent density different from the uppermost layer and from the lowermost layer and removing liquid from the so separated fraction.

2. The process which comprises mixing clay with water, concentrating silicious material in one layer, concentrating organic material in a layer remote therefrom and concentrating purified clay in a layer having a specific gravity between that existing in the other two layers and separating material occurring in the central layer.

3. The process which comprises mixing clay with water, concentrating silicious material in one layer, concentrating organic material in a layer remote therefrom and concentrating purified clay in a layer having a specific gravity between that existing in the other two layers and separating material occurring in the central layer and contacting said material with air of low moisture content and removing water to a concentration of below fifteen per cent.

4. The process which comprises mixing a clay with water, producing a mixture with a specific gravity of between 1.200 and 1.090, separating an impure fraction from one of greater purity, separating water from the fraction of greater purity, treating the clay of greater purity with a chemical and removing excessive chemical by subsequent treatment with water previously separated from a fraction of greater purity.

5. The process which comprises mixing a clay with water, producing a mixture with a specific gravity of between 1.200 and 1.090, separating an impure fraction from one of greater purity, separating water from the fraction of greater purity, treating the clay of greater purity with a chemical and removing excessive chemical by subsequent treatment with water previously separated from a fraction of greater purity and removing water from a fraction of greater purity to produce a purified clay with less than five per cent of water.

In witness whereof, I have affixed my signature hereto.

JUSTIN F. WAIT.